Patented Aug. 12, 1947

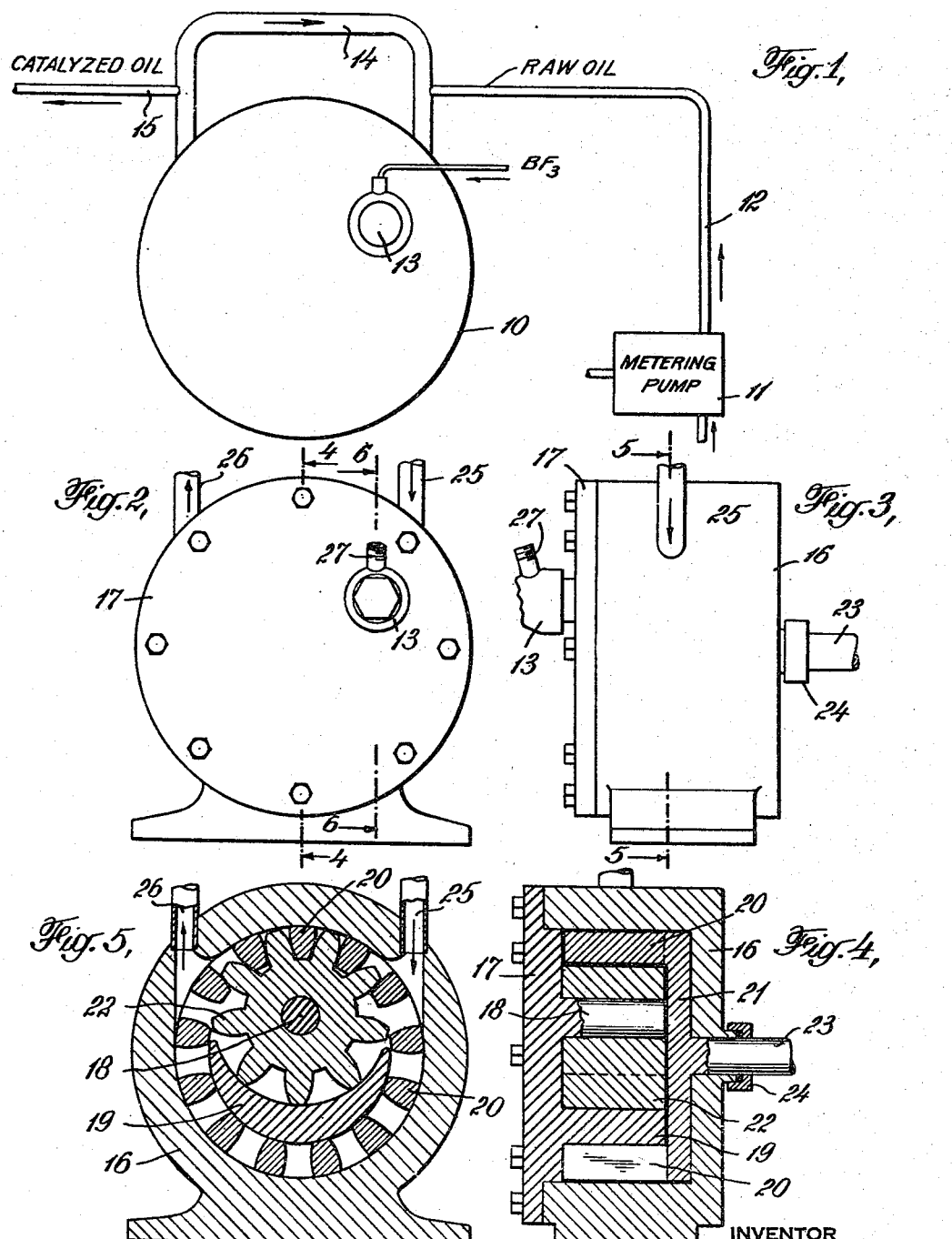

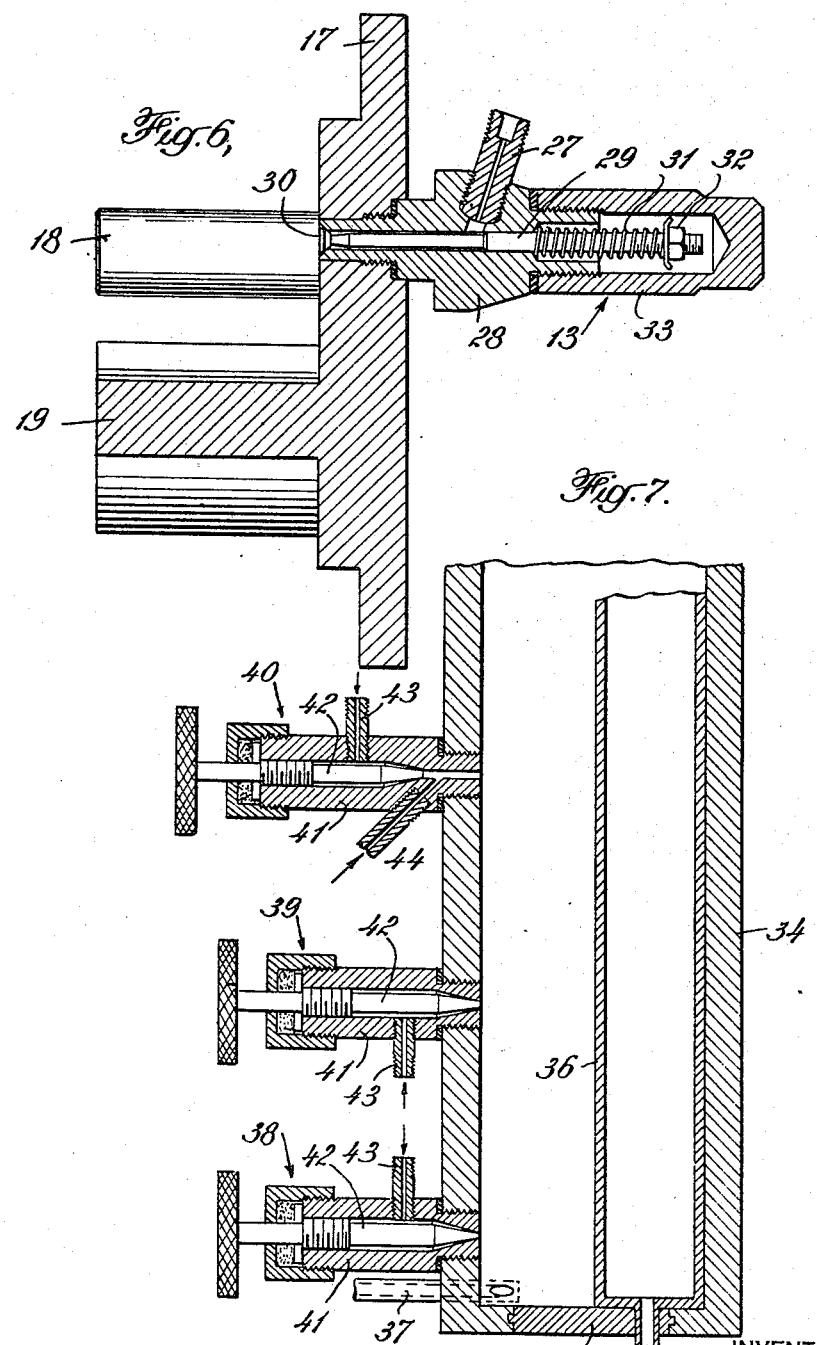

2,425,671

UNITED STATES PATENT OFFICE 2,425,671

PROCESS OF POLYMERIZING

George S. Crandall, Woodbury, and Carleton H. Schlesman, Camden, N. J., assignors to Socony-Vacuum Oil Company, Incorporated, a corporation of New York Application September 17, 1942, Serial No. 458,620

5 Claims. (Cl. 260—407)

1

This invention relates to a device for use in preparing a varnish base by catalytic bodying of drying oils and other processes involving similar problems of required thorough mixing of accurate proportions of reactant materials which tend to form gels during processing if not properly controlled and to a process for that purpose.

It has been common practice for many years to body drying oils in heated kettles in the preparation of varnish bases. It is only in very recent years that suitable means for continuous thermal body have been developed. Apparatus for continuous thermal bodying in a satisfactory manner is described in U. S. Patent No. 2,238,864, issued April 15, 1941, on an application of Malcolm F. Pratt and Carleton H. Schlesman. More recently, it has been found that drying oils can be bodied catalytically through the use of polymerization catalysts such as boron trifluoride to produce varnish bases. These catalytic processes require that small proportions, often a small fraction of one per cent of catalyst be distributed through the oil and the mixture be permitted to body to the desired degree during a suitable period. Concentration of catalyst must be rigidly controlled since an excess in any particular region will cause the bodying reaction therein to proceed at an unduly rapid rate and cause local gelation before the main portion of oil has reached the desired body. Proper mixing is a delicate problem since a relatively minute change in concentration of the catalyst at any particular point as compared with the total mass may represent a tremendously excessive concentration as compared with that desired. Avoidance of catalyst concentrations at particular regions sufficiently high to cause rapid gelation is very difficult.

We have now devised a process and apparatus for continuously mixing raw oil and catalyst under conditions to obtain proper bodying of the oil without gelation in the treating apparatus. According to our invention, the catalyst is added in desired proportions to a mass of oil under treatment in a zone in which the oil is subjected to mechanical working to continuously disperse the catalyst through the oil in rapid and uniform manner, to disperse any solid or semi-solid reaction products that may be adventitiously formed and the point of injection of catalyst is continuously cleaned. Preferably, the oil under

2 treatment is subjected to a recycling action in such manner that the amount of raw oil added is relatively minor with respect to the amount of oil circulating through the mixing zone and a corresponding amount of treated oil is withdrawn from the system; in any event, the catalyst is added in small increments based on throughput of the mixer.

Further objects and advantages of the invention will be apparent from the description below of operations in apparatus illustrated in the annexed drawings wherein:

Figure 1 is a diagrammatic showing of the apparatus set-up according to a preferred form of the invention;

Figure 2 is an end elevation of the mixing pump;

Figure 3 is a side elevation thereof;

Figure 4 is a section on line 4—4 of Figure 2;

Figure 5 is a section on line 5—5 of Figure 3;

Figure 6 is a section through the pump head and injector on line 6—6 of Figure 2; and Figure 7 is a sectional showing of a modified form of the apparatus of this invention.

In order to obtain a uniformly catalyzed oil without excessive concentrations of catalyst in any portion thereof for any substantial time, the catalyst is added in small increments as compared with the total amount desired. One advantageous manner of accomplishing that result is shown in Figure 1. The actual mixing is performed in a mixing pump 10 to which raw oil for treatment is supplied by metering pump 11 through pipe 12 while catalyst, such as boron fluoride, is supplied by injector 13. The metering pump 11 and mixing pump 10 are so adjusted that the total throughput of the unit, as controlled by pump 11, is a relatively small fraction of the capacity of mixing pump 10. The output of mixing pump 10 is largely recirculated through a bypass 14 to again pass through mixing pump 10 in company with fresh raw oil being supplied thereto by metering pump 11. Oil containing a predetermined amount of catalyst uniformly dispersed therethrough is withdrawn by outlet 15 at substantially the same rate as fresh oil is supplied by metering pump 11.

A preferred form of mixing pump is shown in Figures 2 to 5 inclusive. The pump chamber is enclosed by a pump casing 16 and a head plate 17 which carries a stub shaft 18 and a crescent shaped member 19, the shaft 18 being eccentric with respect to the axis of the pump casing. A series of teeth 20 on the face of a circular plate 21 form a structure in the nature of a ring gear having no rim which permits flow of fluids from the exterior to the interior of the gear between the teeth. Meshing with the teeth 20 is a pinion 22 mounted for free rotation on the stub shaft 18. Provision is made for rotation of plate 21 from a source of power not shown, comprising a shaft 23 through a packing gland 24 in the casing 16.

An inlet 25 and an outlet 26 provide for flow of fluid to and from the pump chamber.

It will be seen that, as the plate 21 is rotated about its axis (for example, clockwise in Figure 5) oil will enter at 25, passing between the teeth 20, to fill the spaces between teeth 20 and between the teeth of pinion 22. These are rotated in contact with member 19 which prevents substantial flow past the ends of the teeth, to a position near outlet 26, where the meshing of teeth 20 with pinion 22 forces the oil from between the teeth into said outlet. Other known gear pumps and the like can be used with good results.

Mounted in an opening through the head is the catalyst injector indicated generally at 13 which includes a nipple 27 for fitting a line from a source of catalyst supply not shown. A preferred form of injector shown in Figure 6 comprises a base 28 adapted for threaded engagement in suitably tapped bore in the head 17. A stem 29 having an enlarged valve portion 30 is fitted for longitudinal movement in a bore of the base 28 communicating with the bore of nipple 27. The stem is formed substantially as shown to provide a passage through the bore of base 28 from nipple 27 to the inside of the pump chamber by way of the valve formed by portion 30 and its seat. The valve is spring loaded by a coil spring 31 and adjusting nut 32 threaded on the stem. The spring with its associated nut is covered by a cap 33 which serves to seal the valve against leakage of catalyst to the atmosphere.

Using the mixing pump and injection valve shown in Figures 1 to 6, inclusive, while supplying raw oil at a rate which is only a fraction of the capacity of the mixing pump, catalyst is mixed with the raw oil in small increments, thus reducing the possibility of unduly rapid local reaction tending to result in gel formation. There is also provided a mixing chamber in which each part is either continuously or repeatedly cleansed by relatively close contact with another part whereby any gel-like bodies which may be formed are swept away and thoroughly mixed with the remainder of the material under treatment in a very short time. Even the injection valve itself is kept clean by the combined effects of its own structure and the sweeping of moving parts across its end. Considerable pressure is necessary to open the valve and the flow into the pump chamber is through a restricted opening which causes catalyst flow to be sufficiently rapid to insure that no substantial quantity of material treated shall build up at the valve seat.

Figure 7 illustrates another method of and apparatus for accomplishing the desired result and shows modified forms of injection valves. In brief, this embodiment includes an elongated mixing zone through which is passed the oil to be catalyzed. The catalyst is injected into the body of oil in the mixing zone in small increments along the length of the zone and means are here provided for continuously dispersing the catalyst and breaking up and dispersing any plastic or semi-solid material such as gel which may be formed by adventitious and localized high concentrations of catalyst. It should be noted that unless promptly broken up, any local concentration of catalyst may soon become unmanageable. A spot of high catalyst concentration is a spot at which there will be accelerated polymerization of the oil with consequent increase in viscosity. The local increase in viscosity renders it more unlikely that thorough dispersal may be obtained by conventional mixing devices and the protected portion proceeds rapidly to the gel stage, at which time conventional mixing devices are wholly inadequate. This problem of gelation in continuous treating apparatus is recognized and a solution proposed in the Pratt et al. patent noted above. In a sense, the embodiment of Figure 7 may be regarded as a modification of the Pratt et al. apparatus, with the distinctions that the present apparatus provides for addition of a catalytic agent and that bodying of the oil to the desired stage does not usually take place in the apparatus shown. Reference is made to the Pratt et al. patent as describing certain basic features applicable to this invention and for the showing therein of modifications suitable for the present purpose.

The apparatus of Figure 7 includes a cylindrical shell or casing 34 closed at each end by a rotatably plate 35 in which is eccentrically mounted a rotor 36. Means not shown, acting on the rotor shaft 36a, are preferably provided to cause rapid rotation of rotor 36 with respect to plates 35 and that rotation may be such as to cause rolling or sliding contact between casing 34 and rotor 36. The plates 35 also rotate rapidly with respect to casing 34, thus causing all parts of these two members to be repeatedly brought into contact with each other, thus dispersing the catalyst and thoroughly mixing the mass. The catalyst is supplied to the body of oil in small increments by means of injection valves 38, 39, 40 and others not shown which may be of the type shown in Figure 6 or of any other suitable construction such as the two types shown in Figure 7. Thus it may be seen that the catalyst is supplied to the body of the oil as the oil moves along its path within the casing 34 from the inlet end of the casing adjacent to the inlet 37 to the opposite end of the casing 34 adjacent to a corresponding outlet positioned at such other end.

Nozzles 38 and 39 are of the same type, each comprising a body 41 having a threaded portion engaging a tapped bore in the casing 34. A bore in the body 41 tapered toward the mixing chamber receives a valve stem 42 of such dimensions that a passage is provided to the valve opening from a catalyst inlet 43. It will be noted that the valve and its seat are so formed that the opening into the mixing chamber is flush with the wall thereof and the end of the valve stem is also flush with the chamber wall in closed position. The valve parts exposed to oil are thus protected from accumulations of gelled oil in either open or closed position. When open, the rush of catalyst under pressure sweeps oil out of the valve while in closed position, the valve parts are repeatedly contacted by the rotor.

Valve 40 utilizes a fluid cleansing principle analogous to valves 38 and 39 in open position. The valve body 41, stem 42 and catalyst inlet 43 are of substantially the same nature except that the bore in body 41 is continued as a restricted passage beyond the valve seat to a free opening in the surface of casing 34. An inlet 44 to the restricted passage provides means for admitting an inert gas, such as nitrogen, or an inert liquid, such as naphtha, to the passage in order to keep it flushed. In actual practice of the invention, nitrogen is normally used in connection with any type of injection valve when employing a gaseous catalyst, such as boron fluoride, in order to maintain a rapid gas flow without introducing unduly large amounts of catalyst. Similarly, an inert liquid as diluent, suspending agent or solvent, may be used with liquid or solid catalyst in such proportions as are required to give adequate flushing action.

As one example of the process described above in general terms we set out below a process using the apparatus of Figures 1–6 inclusive which we have previously utilized for the bodying of oiticica oil by the action of boron fluoride. In such specific use of the described apparatus a mixing pump similar to the mixing pump 10 was used as the mixing chamber. The mixing pump was driven at 1725 R. P. M. directly by an electric motor and had a nominal capacity at that speed of 80 gallons per hour. The catalyst was introduced by means of a spring-loaded injection valve such as that disclosed in Figure 6. This valve was introduced through the head plate with a small clearance between the end of the valve and the end of the gears. A short by-pass connected the inlet and the outlet of the pump. The untreated oil was introduced through a metering pump into the inlet of the mixer and discharged through a T in the outlet. The normal operating throughput of oiticica oil was approximately one gallon per hour. The catalyst consisted of a gaseous mixture of approximately equal parts by volume of nitrogen and boron tri-fluoride. The injection valve was set at approximately 20 pounds per square inch opening pressure. When operated in this way concentrations of boron fluoride could be added which, under other conditions, would quickly clog the mixer. A measure of the completeness of dispersion of the catalyst into the oil is given by the observation that the diluent gas (nitrogen) was so completely mixed into the oil that the product was discharged from the mixer as a foam which did not separate completely for several hours, and required centrifuging before viscosity determinations by the Gardner-Holdt bubble method could be made. Although the above is given as an example of how our process has been successfully operated, other applications of the process will be apparent. We point out, however that for satisfactory operation the recycle ratio is preferably at least 20 to 1.

In general, the time required for a given oil to reach a given body is dependent primarily on temperature and catalyst concentration. The total amount of catalyst used will, therefore, depend on the temperature and the time that the catalyzed oil is to be stored before use. Where smaller amounts of catalyst are to be employed, the proportionate part to be added to the oil in each increment may be larger. In general, however, for catalyst concentrations to give practicable bodying times, not more than about 10% of the catalyst, preferably not more than about 6%, should be added in any one increment. In any event, no increment of catalyst should be greater than 10% of that which will result in gelation of the oil in about one hour. These same considerations may be expressed as recycle ratios where a continuous recycling process is used. Thus the recycle ratio should be at least 9 to 1, or the rate of flow through mixing zone, including both fresh and recycled oil, should be not less than ten times the amount of raw oil which would gel in about one hour if catalyst were added thereto at the same rate.

We claim:

1. A process of preparing a reaction mixture of a drying oil with a polymerization catalyst for such reaction which comprises circulating a body of said oil in a cyclic mixing zone including a mixing stage, adding said catalyst to said oil in said mixing stage, subjecting the oil in said zone to agitation capable of efficiently dispersing the catalyst in the oil and of dispersing local masses of any plastic solid or semi-solid phase formed, adding fresh oil to said zone prior to said mixing stage and withdrawing mixture from said zone subsequent to said mixing stage at a rate substantially equivalent to the rate of said adding of fresh oil, said rate being not substantially greater than about 10% of the rate of flow in said cycle.

2. A process of preparing a mixture of oiticica oil and boron fluoride which comprises circulating a body of said oil in a cyclic mixing zone including a mixing stage, adding said boron fluoride to said oil in said mixing stage, subjecting the oil in zone to agitation capable of efficiently dispersing said boron fluoride in said oil and of dispersing gels of said oil, adding raw oil to said zone prior to said stage and withdrawing mixture from said zone subsequent to said stage at a rate substantially equivalent to the rate of said adding of raw oil, said rate being not substantially greater than about 10% of the rate of flow of said cycle.

3. A process of preparing a reaction mixture capable of reacting to form a plastic solid or semi-solid phase the mixture comprising a drying oil and a polymerization catalyst for such reaction; which comprises the steps of (1) circulating a body of said oil in a cyclic mixing zone including a mixing stage, (2) adding said catalyst to said oil in said mixing stage, (3) subjecting the mixture in said zone to agitation, (4) adding fresh oil to said zone prior to said mixing stage, and (5) withdrawing mixture from said mixing zone subsequent to said mixing stage at a rate substantially equivalent to the rate of said adding of fresh oil.

4. A process of preparing a reaction mixture of drying oil with a polymerization catalyst which comprises the steps of (1) circulating a body of said oil in a cycling mixing zone including a mixing stage, (2) subjecting the oil in said mixing zone to agitation capable of efficiently dispersing said catalyst in said oil and of dispersing gels of said oil during the time that the oil is in said zone and (3) adding said catalyst to said oil within said zone in small increments, each of which is not more than about 10% of the total amount of catalyst to be added while said material is in the mixing zone and is not more than about 10% of that which would cause formation of gel in about one hour.

5. A process of preparing a reaction mixture of a drying oil with a polymerization catalyst which comprises the steps of (1) circulating a body of said oil and catalyst in a cyclic mixing zone including a mixing stage, (2) adding catalyst to said body in said mixing stage, (3) subjecting the oil and catalyst in said zone to agitation, (4) adding fresh oil to said zone prior to said mixing stage and (5) withdrawing mixture from said zone subsequent to said mixing stage at a rate substantially equivalent to the rate of addition of catalyst and fresh oil; the rate of flow of oil and catalyst in the mixing zone being at least ten times greater than the rate of addition of oil and catalyst and of withdrawal of the mixture thereof.

GEORGE S. CRANDALL.
CARLETON H. SCHLESMAN.

REFERENCES CITED

The following references are of record in the file of this patent:

UNITED STATES PATENTS

| Number | Name | Date |
| --- | --- | --- |
| 1,241,067 | West | Sept. 25, 1917 |
| 2,244,666 | Auer | June 10, 1941 |
| 2,116,380 | Bauer | May 3, 1938 |
| 2,238,864 | Pratt et al. | Apr. 15, 1941 |
| 2,185,592 | Jordon | Jan. 2, 1940 |
| 2,316,187 | Pratt | Apr. 13, 1943 |
| 2,100,274 | Clayton | Nov. 23, 1937 |